Oct. 9, 1962  A. J. CROUCHMAN  3,057,198
ICING CONDITION DETECTOR
Filed Feb. 3, 1958

Inventor:
Alan John Crouchman
By Brown, Jackson, Boettcher + Dienner
Attys.

United States Patent Office 3,057,198
Patented Oct. 9, 1962

3,057,198
ICING CONDITION DETECTOR
Alan John Crouchman, Enfield, England, assignor, by mesne assignments, to Sangamo-Electric Company, Springfield, Ill., a corporation of Delaware
Filed Feb. 3, 1958, Ser. No. 712,872
1 Claim. (Cl. 73—170)

This invention relates to instrument arrangements for detecting atmospheric conditions likely to result in the formation of ice on moving objects such as aircraft. It is already known to construct a device for detecting icing conditions utilising the phenomena that the temperature of a heated body, which is freely exposed to air in which water is present in droplet form, becomes decreased due to the cooling produced by the evaporation of the water. In one known arrangement utilising this principle two heated bodies were provided and the air through which the object carrying the device was moving was allowed to impinge directly against one of such bodies whereas the air impinging against the second body was arranged to pass through means for freeing it of substantially all of the droplets of water suspended therein. Each of the bodies was arranged to be supplied with heat at a constant rate and temperature responsive means associated with each of the bodies operated to determine their difference of temperature.

The provision of means for freeing air of substantially all of the droplets of water suspended therein leads to considerable difficulties in construction and also in obtaining reliable operation over a protracted period of time and under the widely varying range of air velocities, air densities, air temperatures and degrees of air turbulence which are likely to be encountered in the operation of moving objects such as aircraft.

The object of the present invention is to provide a simplified arrangement for detecting icing conditions in which the use of the aforesaid means for freeing the air of substantially all of its suspended water droplets is avoided.

It has been found that, for the purpose of obtaining a reliable indication of icing conditions, as distinct from obtaining accurate measurement of the particular atmospheric conditions prevailing at any time (such as may be necessary for physical research purposes) it is not essential to free the air impinging upon the second heated body of all or even substantially all of the water droplets suspended therein. Provided a partial removal of predetermined extent, such as 40% or more, of the water droplets is effected in the air impinging upon the second headed body, a reasonable indication can be obtained under the conditions met with in normal aircraft operation.

In accordance with the present invention an arrangement for detecting atmospheric conditions likely to result in the formation of ice on a moving object comprises a first and a second body each arranged to be supplied with heat at a constant rate and each adapted to be exposed to the air stream around the moving object, said second heated body being provided with shielding means sufficient to cause partial removal only of any water droplets in said air stream, and means for determining any difference of temperature between said bodies. In a preferred arrangement according to the invention, the two heated bodies are of substantially identical form, size and shape and are placed in tandem, i.e. in line with the direction of flow of said air stream and in relative positions such that the first, forward, body provides the requisite screening effect upon the second, rearward, body.

In order that the nature of the invention may be more readily understood, one practical embodiment thereof will now be described in greater detail and by way of example only with reference to the accompanying drawings, in which:

FIG. 3 is a circuit diagram of the arrangements of the said embodiment, while

FIG. 4 is a diagram illustrating the mounting position of the device relative to the normal direction of air flow past the moving object.

Figure 1:
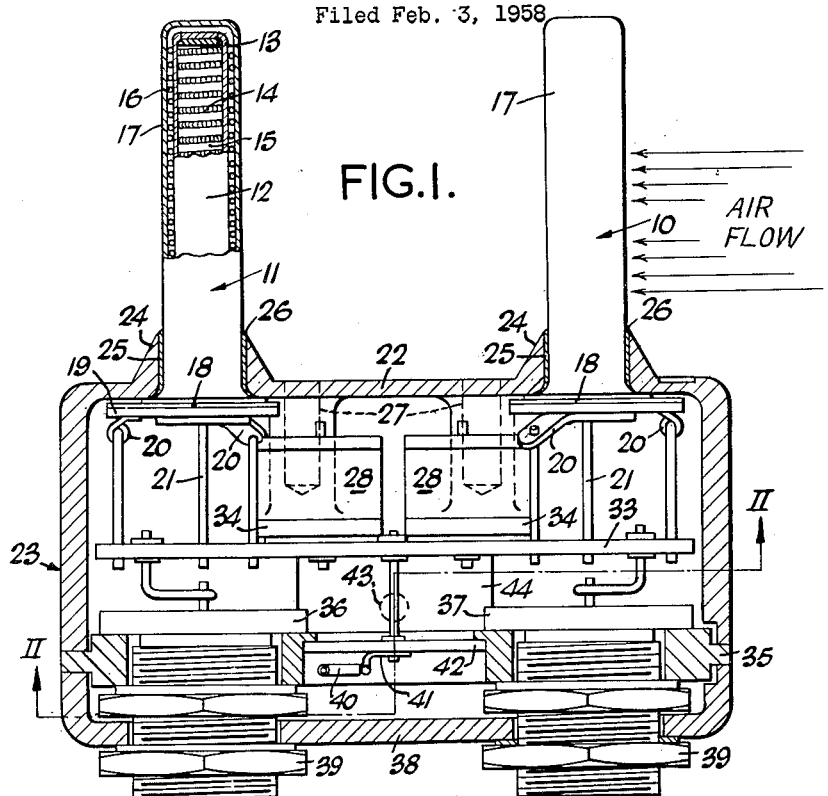
FIG. 1 is a longitudinal sectional view, taken on a plane coincident with the centre lines of each of the two heated bodies, of a device particularly adapted for use on an aircraft.

Referring to the drawings, the device comprises two heated bodies, namely a first heated body 10 and a second heated body 11. The bodies 10, 11 are of substantially identical shape, size and form and each comprises a resistance type thermometer bulb as shown at 12 on the body 11 which bulb is similar in construction to that described in detail in British Patent No. 634,444 and as normally used for the measurement of temperatures in the range between −100° C. and +500° C. Each of these resistance bulbs consists of a hermetically sealed outer tubular casing 13, preferably of stainless steel, within which is disposed a strain-free winding 14 of platinum wire mounted in a helical groove in a supporting former 15 of anodised aluminium, the winding 14 being arranged to be in good thermal conductive relationship to the outer casing 13 whereby the heat condition of the latter is promptly transmitted to the winding 14 to effect alteration of its resistance value in well known manner.

As shown more clearly in the fragmentary portion of the body 11 in FIG. 1, each of the two similar resistance bulbs 12 embodied in the bodies 10 and 11 is provided with an electric heater winding 16 which is wound directly around but in insulated relationship to the external surface of the casing 13 of the bulb 12. The winding 16 is of siutable insulated wire, such as wire having a covering of woven glass impregnated with silicone varnish. The bulb 12 and its added heater winding 16 is then enclosed within a further tube 17, preferably also of stainless steel. A suitable wall thickness for the tube 17 is .010 inch. Particular attention is paid to the accuracy of fit of the outer tube 17 upon the heater winding 16 in order to keep the temperature gradient between the heater winding and the outer tube to a minimum. Preferably the outer tube 17 is subjected to a coining operation after being placed in position whereby the heater winding insulation is tightly compressed and any tendency to form hot spots is avoided.

Each heated body 10, 11 has an enlarged and flanged lower end 18 to which is secured a terminal plate 19 of insulating material carrying connection means such as soldering tags 20 by which electrical connection may be established with the ends of the heater winding 16. Further wires 21 projecting from the end of the bulb 12 provide connection with the resistance bulb winding 14.

Each of the heated bodies 10 and 11 is mounted in the upper surface 22 of a base 23 of hollow box-like form and made, preferably, as an aluminium die-casting. Upstanding collars or flanges 24 are provided around the two apertures 25 through which the bodies 10, 11 project, such apertures each being preferably slightly larger than the outer diameter of the associated body to allow the provision of a layer of suitable packing and sealing compound 26 such as that known under the registered trademark "Araldite."

Figures 3, 4:
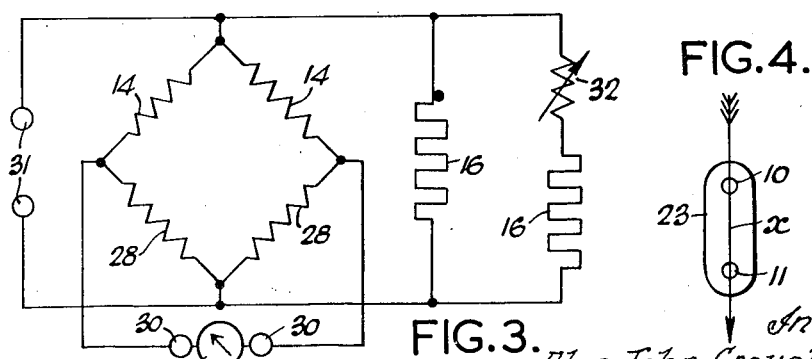

The two heated bodies 10, 11 are disposed whereby their respective axes are parallel and at right angles to the upper surface 22 of the base 23, the latter being provided with tapped holes as at 27 for the reception of fixing screws whereby the complete unit may be mounted on the moving body, e.g. upon a wing surface or a body surface of an aircraft, so that the common plane *x*, FIG. 4, which includes the parallel axes of the two bodies 10, 11 is coincident with or substantially coincident with the direction of air flow past the moving body.

The distance between the two heated bodies 10, 11 is preferably determined experimentally but in one particular arrangement, using bodies whose outer tubes 17 each had a diameter of 0.29" and whose exposed portions were 1.4" in length, the optimum centre-to-centre spacing of the two bodies was 1.5".

Referring now to FIG. 3, the temperature-sensitive resistance windings 14 of the respective resistance bulbs 12 of the two bodies 10, 11 are connected as one pair of adjacent arms of a Wheatstone bridge type circuit while two further fixed resistors 28 are arranged to form the opposite pair of adjacent arms of the bridge. A galvanometer 29 connected through terminal means 30 across one diagonal of the bridge is arranged to indicate out of balance conditions while a suitable power source such as a low voltage D.C. supply of 26 volts is connected through terminal means 31 across the other diagonal of the bridge. The added heater windings 16 of the heated bodies are conveniently connected in parallel across the same low voltage D.C. supply and at least one of these heater windings is preferably provided with a series-connected adjusting resistance 32 whereby the power ratio between the heating currents supplied to the two heated bodies may be adjusted to cause both of the bodies to assume exactly the same temperature under dry-air conditions.

Figure 2:
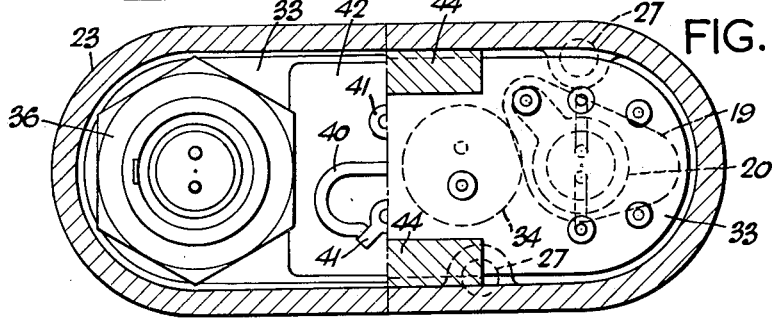
FIG. 2 is a horizontal sectional view through the device taken on the line II—II of FIG. 1.

Reverting to FIGS. 1 and 2, the various elements of the circuit, apart from the two heated bodies 10, 11 and the galvanometer 29 which is arranged as a visual indicator at some more remote position such as the pilot's control panel of an aircraft, are disposed within the interior of the base 23 on a mounting plate 33 of insulating material which is conveniently fabricated in known manner to provide the necessary circuit interconnections by the so-called "printed-circuit" technique. This plate 33 serves to support the two fixed resistors 28 carried on bobbins 34. The various interconnections between the parts are made by short stiff copper wires as shown.

The open lower face of the base 23 is closed by a separate closure plate 35 containing spaced apertures for receiving screw threaded bushes 36, 37 which each contain a suitable socket connector for providing respectively the necessary terminal means 30 and 31, FIG. 3. The closure plate 35 is held in position on the base 23 by means of screws 43 entering upstanding lugs 44 on the upper surface of the plate 35. A further removable cover plate 38 is arranged completely to close the underside of the casing, such cover plate being held in place by means of further nuts 39 on the two bushes 36, 37.

The adjusting resistance 32, FIG. 3, is conveniently in the form of a spirally wound resistance wire mounted upon a flexible core 40 and provided at each end with suitable connecting tags which are soldered to further soldering tags 41 carried upon a sub-panel 42 mounted in the centre of the closure plate 35. Such disposition facilitates the initial adjustment of the resistance 32 in series with one of the two heater windings. The complete unit may be sealed in any suitable manner, e.g. by filling with a suitable insulating compound after assembly and adjustment.

In the operation of the device air impinges first upon the first or leading heated body 10 and in doing so is robbed to some considerable extent of the various water droplets which may be entrained therein. The air reaching the second heated body 11 is that which is flowing past the first heated body 10 but by virtue of the shielding or masking effect of the first body on the second, a substantial portion, i.e. 40% or more, of any entrained water droplet content of the moving air is removed before it can impinge upon the second heated element. After initial adjustment of the resistance 32 to ensure that the heat applied to each of the two bodies from the local power source is such that both bodies assume the same temperature in dry air conditions, the galvanometer 29 provides the requisite indication of icing conditions or incipient icing conditions by the extent of the deflection of the galvanometer pointer away from the bridge-balanced position due to the difference of temperature between the bodies 10 and 11.

In an arrangement according to the invention the need for special baffle or compartment design aimed at freeing the impinging air of all or substantially all of its suspended water droplets is completely avoided. Provided the air impinging upon the second and more rearward of the two bodies has a substantial proportion of the water droplets entrained therein removed, so the arrangements can be adapted to provide a reliable indication in the simplest possible manner. An arrangement according to the invention is capable of providing a reliable indication of the onset or termination of icing conditions even under surrounding conditions, e.g. of aircraft yaw, where the centre lines of the two heated bodies 10, 11 are not directly in line with the air flow and the normal degree of water-shedding is accordingly reduced. It may be desirable in some circumstances to provide switch means, operated by the pressure of the air flow past the moving object, which serve to disconnect the power supply and thereby prevent overheating of the bodies 10, 11 when the object is stationary or moving at a speed below a predetermined minimum.

While the invention has been more particularly described in connection with the provision of a visual indication of incipient icing conditions, it will be obvious that the galvanometer 29 may be either supplemented or completely replaced by arrangements, such as a relay controlled circuit, for effecting automatic control of ancillary equipment provided on the moving body for combating the formation of ice thereon under icing conditions.

I claim:

An ice detecting device for moving objects comprising a casing, a first and second body each including a separate casing secured at one of its ends to said first named casing to project externally outwardly therefrom and at right angles thereto whereby they will both be disposed in direct contact with the airstream created by said moving object, the projecting ends of said body casings being completely closed externally of the casing, said first and second bodies being of substantially identical shape, size and form and being disposed in spaced parallel relationship, whereby said first body acts as a shield for said second body, the first body thereby serving to partially remove any water particles from the airstream impinging thereon before such airstream reaches said second body, and means within said first named casing connected with said first and second bodies for determining any difference of temperature between said bodies.

References Cited in the file of this patent

UNITED STATES PATENTS

| | | |
|---|---|---|
| 2,656,525 | Kinsella | Oct. 20, 1953 |
| 2,766,619 | Tribus et al. | Oct. 16, 1956 |
| 2,914,755 | Fraser | Nov. 24, 1959 |